(12) United States Patent
Raney

(10) Patent No.: US 6,188,348 B1
(45) Date of Patent: Feb. 13, 2001

(54) RADAR ICE SOUNDER WITH PARALLEL DOPPLER PROCESSING

(75) Inventor: Russell Keith Raney, Arnold, MD (US)

(73) Assignee: The Johns Hopkins University, Baltimore, MD (US)

(*) Notice: Under 35 U.S.C. 154(b), the term of this patent shall be extended for 0 days.

(21) Appl. No.: 09/370,647

(22) Filed: Aug. 6, 1999

Related U.S. Application Data

(60) Provisional application No. 60/095,789, filed on Aug. 7, 1998.

(51) Int. Cl.[7] .............................. G01S 13/88; G01S 13/89; G01S 13/08
(52) U.S. Cl. .................................. 342/22; 342/25; 342/26; 342/99; 342/120; 342/135; 342/191; 342/195; 342/196
(58) Field of Search .................................. 342/21, 22, 26, 342/27, 28, 165, 173–175, 190–197, 25, 99, 120, 121, 122, 123, 135, 89, 98, 118, 134

(56) References Cited

U.S. PATENT DOCUMENTS

| | | | |
|---|---|---|---|
| 3,665,466 | * 5/1972 | Hibbard | 342/22 X |
| 5,179,383 | * 1/1993 | Raney et al. | 342/25 |
| 5,736,957 | * 4/1998 | Raney | 342/99 |
| 5,796,363 | * 8/1998 | Mast | 342/22 |

\* cited by examiner

Primary Examiner—Bernarr E. Gregory
(74) Attorney, Agent, or Firm—Carla Magda Krivak

(57) ABSTRACT

A radar ice sounder which employs parallel Doppler processing obtains more reliable and accurate radar ice sounding. The invention uses both incoherent and coherent techniques, in the same paradigm, to achieve simultaneously high Signal-to-Noise Ratio, high Signal-to-Speckle standard deviation Ratio, and high Signal-to-Clutter Ratio.

9 Claims, 9 Drawing Sheets

RADAR ICE SOUNDER WITH PARALLEL DOPPLER PROCESSING

RELATED APPLICATIONS

This application claims the benefit of U.S. Provisional application No. 60/095,789, filed on Aug. 7, 1998.

STATEMENT OF GOVERNMENTAL INTEREST

This invention was made with Government support under Contract No. N00024-98-D-8124 awarded by the Department of the Navy. The Government has certain rights in this invention.

BACKGROUND OF THE INVENTION

1. Field of the Invention

The present invention teaches a new paradigm for a radar instrument using incoherent and coherent techniques and supporting data processing for obtaining accurate ice sounding profiles.

2. Description of the Related Art

Radar ice sounding is increasing in importance, both on earth and for planetary applications. The recent re-discovery of Lake Vostok, lying some 3 km below the surface of the Antarctic ice sheet, is one example. Not only is Lake Vostok of interest for its potential paleobiology, its observation at depth offers at least a crude approximation to the challenges of seeing many kilometers into the ice mantel of Europa, Jupiter's satellite. Substantial challenges continue to thwart efforts to survey in depth the ice sheets and glaciers of Greenland, Iceland, and Antarctica.

To date, all attempts to improve the performance of radar ice sounders are characterized by a trade-off between coherent and incoherent integration. This trade-off within the current state of the art implies a larger Signal-to-Clutter ratio (SCR) and a smaller Signal-to-Speckle Standard Deviation ratio (SSR), or a smaller SCR and a larger SSR. Up until now there has been no radar ice sounder technique that exploits the advantages of both forms of integration, nor an ice sounding radar that promotes transformation of the data into the Doppler domain, nor an ice sounder that implements waveform delay compensation and parallel processing over the data in the various Doppler bins. Some examples of conventional ice sounder techniques are given below.

Incoherent approaches to radar ice sounders include radar sounders patterned after conventional incoherent pulse-limited radar altimeters as shown in FIGS. 1(a) and 1(b), where FIG. 1(a) is an elevation view and FIG. 1(b) is a plan view of the illumination geometry of an ice sounding radar. The objective is to measure the depth $h_1$ of the lower surface of an ice sheet beneath the upper surface, seen from an observing altitude h above the ice. (Of course, the situation generalizes to more complex layering and volume scattering.) A low loss tangent characterizes the ice, along with a velocity of propagation $c_1$ that is typically on the order of c/1.7, where c is the speed of light in free space. Generally, ice sounding is performed from a sled or low flying aircraft. This minimizes the side scatter and maximizes the energy penetrating the surface. However, if the terrain is rough or a planetary body is being sounded, such as Europa, then the altitude h must be larger, causing a breakdown in the performance of the sounder.

An ice sounding radar has a frequency that is low for radar, typically 50–150 MHz, and a wavelength of approximately 6 m–2 m, respectively, in free space. This means that there is rather little directivity advantage to be gained from the antenna. Off-nadir scatter may arise from the surface at the same time delay as the depth signal of interest, but from nuisance features that may lie at a considerable distance from nadir.

The same geometric principles apply to an ice sounder as are encountered in pulse limited radar altimetry. The most important of these is that on any given surface (or reflecting plane at depth), concentric annuli are resolved by the intersection of the pulse and that surface. These annuli all have nominally equal areas. Thus, if there are surface scatterers illuminated by the antenna pattern that happen to be at the same radar time delay as the lower surface of the ice sheet, then their corresponding reflected signals will arrive together with the depth signal, and compete with it. These unwanted reflections are known as clutter. Since the surface reflections do not suffer attenuation from the ice, and they may arise from a large area, the resulting clutter power may be as large as or larger than that of the desired signal.

Thus, to summarize the incoherent approach to radar ice sounding, application of the conventional radar altimetry paradigm leads to results that have relatively poor SCR. Acceptable Signal-to-Noise Ratio (SNR) can be assured if sufficient transmitter power is available. This conventional approach usually leads to acceptable SSR. The incoherent approach only works well when the sensor/ice sheet geometry is such that clutter signals are not encountered. This constraint augers against larger radar altitudes, and compromises sounder effectiveness in all but the simplest ice sheet sounding opportunities. The incoherent technique is known as incoherent stacking in the geophysics community.

Another approach to the basic ice sheet sounding problem is a coherent method that uses coherent (Doppler beam-sharpened) integration as shown in FIGS. 2(a) and 2(b) which show an elevation view and a plan view, respectively. Although this approach has been shown to improve the SCR of the ice soundings, the gain against clutter is at the expense of degraded performance in other regards.

The viewing geometry is the same as before. There is one additional requirement on the radar, namely, that it must maintain pulse-to-pulse coherence in the data sequence. It follows that coherent integration in the along-track (pulse sequence) direction singles out the one Doppler window within which the phase is relatively constant. At all other Doppler locations, the higher frequency Doppler components tend to cancel each other out. Of course, this is the objective of coherent integration. The result is to reduce the effective along-track width of the sounding footprint to the diameter of the first Fresnel zone, which is centered at zero-Doppler. Coherent integration suppresses the clutter returns arising from other Doppler frequencies. This processing technique is known as unfocused SAR or Doppler beam-sharpening integration.

Clutter contributions may still arise from the across-track resolution cells within the zero-Doppler bin. These cells have areas that decrease as the square root of delay time. Hence, their net clutter contribution is very much less than occurs through incoherent processing.

The negative corollary of this simple coherent integration approach is that much of the received signal is used to cancel out itself, which has the effect of discarding potentially useful data. One consequence of this is a substantial loss in SSR, which is a major disadvantage.

Consider the SSR issue more carefully. Robust sounding waveforms require a large number of degrees of freedom, just like their altimetric counterparts. Incoherent integration of sounder pulses typically implies the summation of several hundred statistically independent waveforms for each sounding profile. On the other hand, coherent integration produces only one waveform for each integration. Of course, several of these may be combined incoherently if redundant data are available. However, the combination of simple coherent integration and its implied data discard leads to a large sacrifice in speckle suppression, a major disadvantage brought about by the means to achieve an increase in the signal-to-clutter ratio.

Thus, to summarize the coherent approach to radar sounding, application of coherent integration or Doppler beam-sharpened processing leads to results that often have low SSR. Acceptable SNR can be assured if sufficient transmitter power is available, although the coherent integration technique can compromise that parameter as well. Coherent integration usually improves SCR, and can improve SNR if the radar pulse repetition frequency is sufficiently high. The coherent approach only works well when the sensor/ice sheet geometry is such that redundant data are available to partially offset the loss of data incurred by the coherent algorithm. The coherent approach is known as coherent stacking in the geophysics community.

A remote sensing ice sounding technique that could be shown to offer improved performance simultaneously in all three principle parameters -SNR, SCR, and SSR- would open new and previously unattainable scientific possibilities.

SUMMARY OF THE INVENTION

It is an object of the present invention to provide a radar ice sounder having Doppler processing.

It is another object of the present invention to provide a radar ice sounder that has increased sounding depth and sensor altitude.

It is a further object of the present invention to provide a radar ice sounder that uses parallel processing.

It is still another object of the present invention to provide a method for radar ice sounding that employs block-by-block along-track Fourier transforms (FFTs) of data into a Doppler frequency domain followed by means to correct off-nadir range-delay errors.

It is yet another object of the present invention to provide a radar ice sounder that operates remotely, using a relatively small instrument, and has an output that has a low data rate.

It is a further object of the present invention to employ manifold parallel Doppler integration so that the radar sounding data has high SSR.

It is still a further object of the present invention to exploit a larger portion of the transmitted power than is possible with conventional means.

It is yet a further object of the present invention to provide a radar ice sounder that provides accurate and reliable data.

It is yet another object of the present invention to provide a method for radar ice sounding that can achieve high SNR, SCR and SSR simultaneously.

These objects and advantages are achieved by providing a method for radar ice sounding, including the steps of providing a downwardly directed illuminating wavefront illuminating the surface and interior of an ice sheet, receiving signals reflected from layers and other features within a volume of the illuminated ice sheet, coherently processing the reflected signals, introducing a range curvature correction, and converting radar range time delay to depth profiles within the region under illumination.

In addition a method for radar ice sounding is provided which includes the steps of illuminating a region of ice with a downwardly directed wavefront, receiving reflected signals from the scatterers returned to an ice sounder, coherently processing the reflected signals using block-by-block along track fast Fourier transforms (FFTs) into the Doppler frequency domain, correcting the differential delay of the along track signal components, and forming waveforms that represent the strength of the reflected signals as a function of penetration depth into the ice.

The radar transmits energy pulse-by-pulse, which is constrained to the limits of the illuminating wavefront. The received signals from the surface and within the ice are organized into groups of data or blocks, performing block-by-block along-track FFTs to convert the signal data into the Doppler frequency domain, correcting the differential delay of the data within all Doppler bins to align their respective depth measurements, and incoherently integrating the waveforms within each Doppler bin and integrating incoherently the entire history of reflections from each scatterer across all Doppler bins to from parallel Doppler depth waveform ice sounding measurements. The differential delay correction uses phase multiplication, data shift and other techniques. The incoherent integrating is achieved by averaging waveforms from many parallel offset-Doppler bins.

Additionally, the present invention adapts the delay correction to the dielectric constant of the ice, weighs the incoherent integration across Doppler bins according to the specular directivity of the interval reflection of the radar sounding energy from layers within the ice, and compensates speed and height variations of the radar for performing coherent and incoherent integrations.

These objects, together with other objects and advantages which will be subsequently apparent, reside in the details of construction and operation as more fully described and claimed hereinafter, taken in conjunction with the accompanying drawings, where like reference numerals refer to like parts throughout.

DESCRIPTION OF THE PREFERRED EMBODIMENTS

Figure 1A:
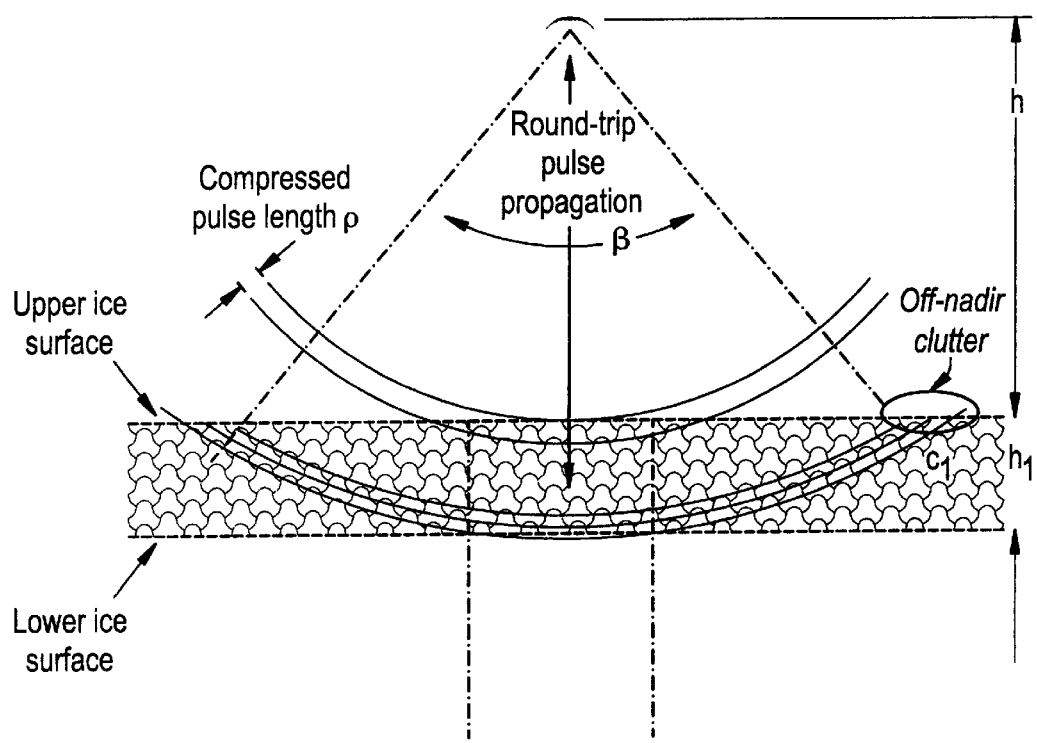
FIGS. 1(a) and 1(b) are an elevation view and a plan view, respectively, of the illumination geometry according to a prior art ice sounder radar patterned after a conventional incoherent pulse-limited radar altimeter.
Figure 1B:
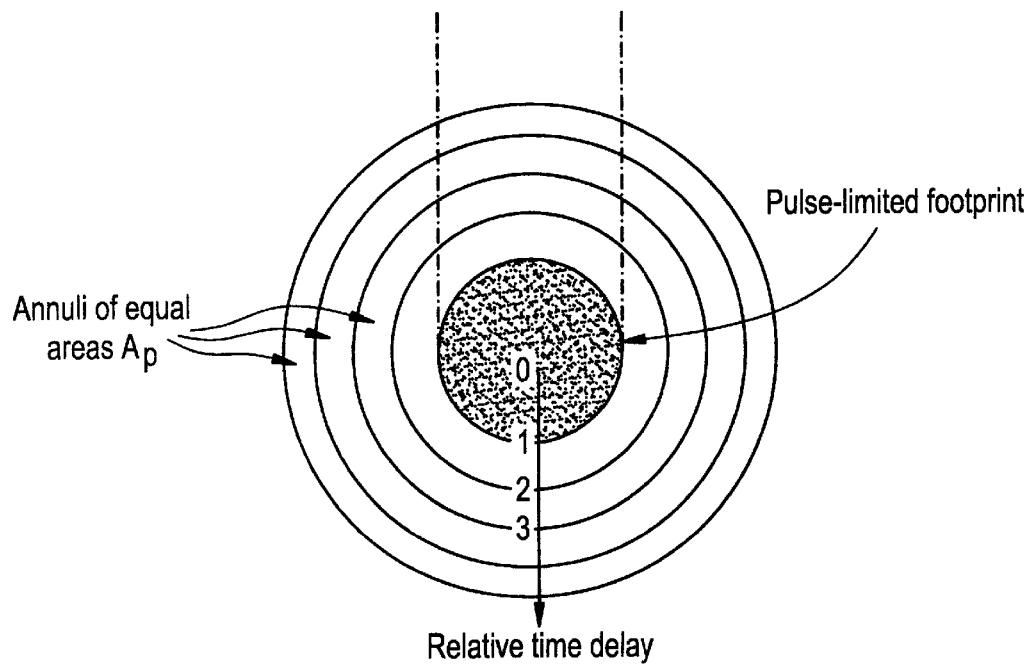

A delay/Doppler algorithm, which was devised originally to advance the state-of-the-art in radar altimetry (see U.S.

Pat. No. 5,736,957 to Raney, issued Apr. 7, 1998, incorporated by reference herein), is the only data analysis technique applicable to the ice sounding challenge that simultaneously achieves high Signal-to-Noise Ratio (SNR), high Signal-to-Speckle standard deviation Ratio (SSR), and high Signal-to-Clutter Ratio (SCR). These attributes are necessary for reliable and accurate radar ice sounding.

The ice sounding application of the present invention illuminates a scene at nadir that has penetrable depth. The measurement objective thus shifts from the surface profiling paradigm of an altimeter to a depth profiling paradigm. An ice sounder optimized with respect to the present invention would differ in certain specifics from currently implemented ice sounding radars. Given the availability of a suitable sequence of radar sounding echo profiles, along-track Doppler analysis, delay correction, and parallel processing steps, can be applied, similar to those at the heart of the delay/Doppler radar altimeter in U.S. Pat. No. 5,736,957. The algorithm used in the delay/Doppler radar altimeter in U.S. Pat. No. 5,736,957 requires that the received signals maintain coherence over a sequence long enough to support Doppler analysis of each group of pulses. When applied to an ice sounder, the algorithm provides individual depth measurements at many Doppler frequencies. These measurements are shifted in range and combined in parallel to produce an output depth waveform.

Ice sounding waveforms are useful only to the extent that they are relatively free of corrupting effects, such as additive noise, multiplicative noise, or extraneous clutter reflections. The essential requirement for small multiplicative noise, measured by the local standard deviation of the processor's output, is to form each output waveform from the summation of many statistically independent incoherent soundings. The present invention provides waveforms with small standard deviation because soundings are derived from many Doppler frequencies in parallel. This is a subtle but substantial step forward over the simple pulse-to-pulse coherent integration that extracts the sounding return from the neighborhood of only one Doppler frequency, which is nominally centered at zero Doppler. Simple coherent integration leads to single-look waveforms that have large standard deviation. An example of simple coherent processing is unfocused SAR (Doppler beam-sharpened) integration. This could allow for ice sounding over rough terrain and over planetary bodies, such as Jupiter's satellite Europa, at orbital altitudes of, for example, 100 km, except that the severe loss of speckle reduction renders this simple coherent technique unsuitable for many ice sounding situations.

Frequently off-nadir scatterers whose unwanted returns may overwhelm and thus mask the desired depth profile directed at nadir provide the limiting constraint in ice sounding. The parallel Doppler processing algorithm, based on the delay/Doppler technique in U.S. Pat. No. 5,736,957, provides superior results over prior art methods because the resulting depth profiles are able to probe more deeply, and have less interference from off-nadir returns. The profiles also have more degrees of freedom, and more post-processing signal strength compared with results from alternative processing strategies, because the processing algorithm enhances the desired waveform over both the multiplicative and the additive noise components.

Figure 3:
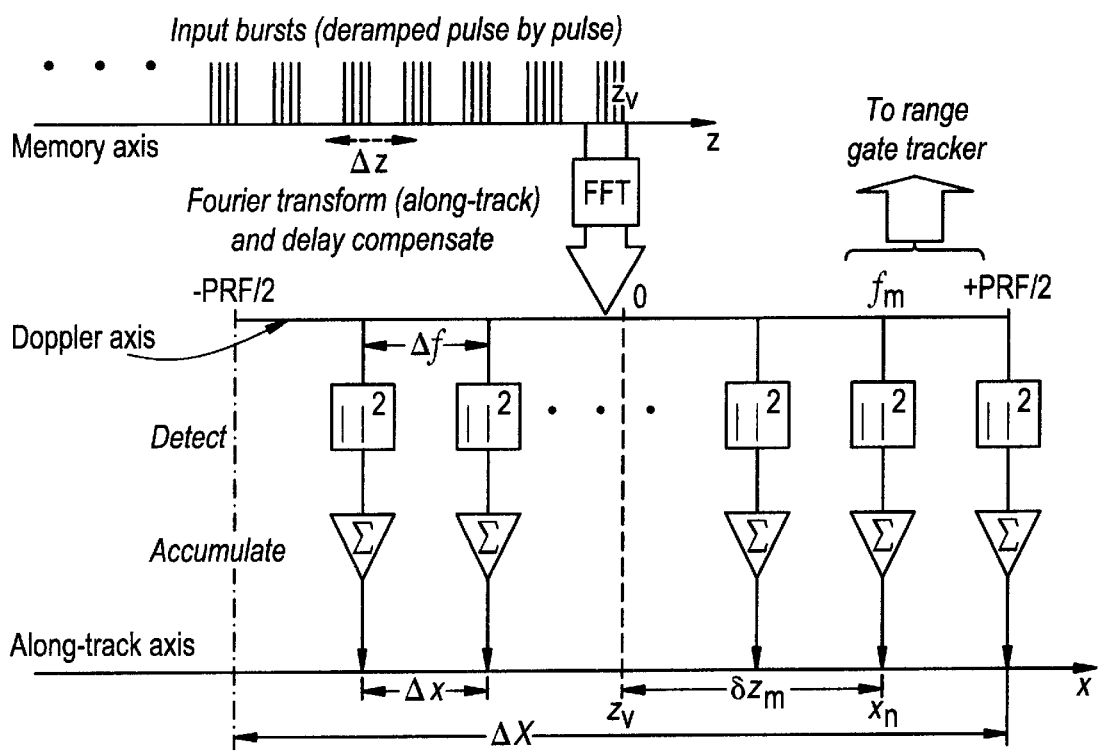
FIG. 3 illustrates the along-track processing for the parallel-Doppler algorithm used in the present invention.

The parallel-Doppler processing algorithm as shown in FIG. 3 provides a first order benefit in that the resulting depth waveforms have much less interference from off nadir returns. In addition, these waveforms also have more degrees of freedom and more post-processing gain. Thus, the present invention takes advantage of both incoherent and coherent integration, and suppresses their respective disadvantages. These benefits are a direct consequence of parallel integration in multiple Doppler bins which enhances the desired waveform over both the multiplicative and the additive noise components. The practical result of these attributes is that the profiles have greater depth penetration, speckle suppression, and off-nadir clutter rejection than are possible by any other means. As shown in FIG. 3, each received pulse echo is coherently demodulated and recorded into a memory. (Full de-ramp of a long linear FM signal is used as the modulation-demodulation means in this example.) Subsequent operations are carried out burst by burst. The transformations shown are applied in parallel to all data within the range gate. At each range index, the along-track transform integrates over the block of (complex) data in memory after all pulses from each burst are received. Delay compensation is applied at this stage, included by inference in the Fast Fourier transform (FFT) operator shown in FIG. 3. The resulting frequency distribution is the Doppler domain, constrained to the Nyquist band defined by the pulse repetition frequency PRF. The frequency increment $\Delta f$ and the corresponding along-track position increments $\Delta x$ are determined by system and burst parameters. In each Doppler frequency bin, the data are detected and added to sums being accumulated for each along-track position $x_n$, whose locations are known through the Doppler frequency $f_m$ and the burst location $Z_v$.

Figure 4:
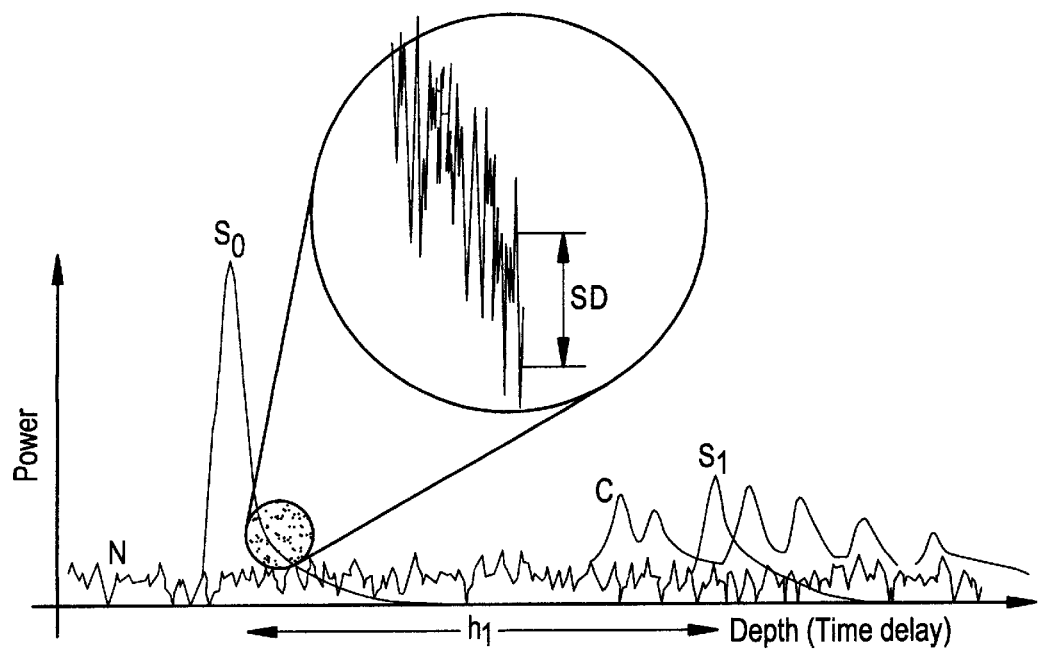
FIG. 4 is a graph of the constituents of a signal received from a depth-profiling radar.

The objective of ice sounding radar is to obtain a sequence of vertical waveforms of reflectivity as a function of depth. The relative power of a typical sounding return is shown in FIG. 4, together with competing components that together constitute the received signal. The main measurement $h_1$ is the distance between the upper surface of the ice and subsequent layers below, expressed as intervals of relatively powerful response, $S_0$ and $S_1$, respectively in FIG. 4. The depth waveform indicates the distance between the surface return ($S_0$) and the bottom return ($S_1$). Additive noise (N) and off-nadir clutter (C) are also shown. Radar energy is backscattered from features, either embedded or on the surface, which are rough (relative to the incident wavelength) and/or where there is a change in the dielectric constant. Variations in the dielectric constant within any given layer will give rise to additional and sometimes subtle reflectivity signatures.

As is true for any radar, the received signal is corrupted by speckle noise. This multiplicative noise is caused by the coherent combination of reflections from the many small individual scatterers within each range interval resolved by the system. Speckle noise is measured by its standard deviation (SD), and can be reduced only by incoherent summation of statistically independent samples of the same reflectivity process.

There are two other competing signals: additive noise (N), and clutter (C). Additive noise occurs primarily within the radar itself. It cannot be reduced in an absolute sense for a given radar, but the (mean) signal level can be increased relative to the noise (1) by increasing the power of the transmitted signal, or (2) by increasing the proportion of the backscattered energy that is converted into the observed output waveform.

Often the dominant limiting constraint on data obtained from a radar ice sounder is due to clutter. Clutter derives from reflections that are from scatterers off at a distance from the nadir direction, and which have the same radar delay as the desired portions of the sounding profile. Clutter would not be a problem if the radar beam could be narrowly directed in the nadir direction. Unfortunately, this is seldom possible for ice sounders, whose long wavelength (approximately 6 meters in free space) implies an illumination pattern that radiates over a wide field of view, often 90 degrees or more. The clutter problem is even more severe when sounding from a remote platform such as an aircraft or satellite, over the Earth's ice sheets or, for example, Jupiter's satellite Europa. This is because the radar beam cannot be narrowly confined in the direction toward nadir because of the long wavelength. Further, the problem is compounded by the fact that an ice sounder responds to reflections from a three dimensional space. Features at a variety of depths, including, in particular, strong surface scatterers, may compete directly with the depth sounding profile. The clutter problem becomes more severe as the minimum range of the sounder from the surface is increased, since the illumination pattern then includes more potential scatterers at each range increment and the desired depth signal is weaker.

For a given frequency, the effectiveness of an ice sounding radar is determined to first order by three parameters: Signal-to-Noise Ratio (SNR), Signal-to-Speckle standard deviation Ratio (SSR), and Signal-to-Clutter Ratio (SCR). As defined, larger is "better" for all three. For all ice sounding radar techniques to date, one or two of these parameters have had to be compromised in order to enhance another. The present invention teaches the first technique that is able to enhance all three of these performance parameters simultaneously.

A major advantage of manifold parallel Doppler integrations is that the approach inherently has high Signal-to-Speckle standard deviation Ratio (SSR).

Another substantial advantage that follows from employing parallel Doppler integrations is that the parallel-Doppler algorithm is able to exploit a much larger fraction of the transmitted power than is possible through more conventional means. Stated generally, the principle is that parallel-Doppler processing implies relatively high post-processing signal-to-noise ratio (SNR). This feature is an essential attribute for an instrument designed to penetrate into a lossy medium, such as an ice sheet, particularly when on-board power assets are at a premium, or when a relatively large stand-off sounding distance is required, as would be true over the glaciers of Iceland or the frozen surface of Europa.

As stated above, the parallel-Doppler algorithm of the present invention provides excellent along-track resolution, which is determined by the Doppler bandwidth of the observed signal rather than by the illumination beamwidth or compressed pulse length. Ice sounding implies relatively large radar wavelengths, which usually dictate that the radiated antenna beamwidth also is very large. Indeed, in certain instruments the antenna pattern may be reasonably represented as omni-directional, in which case the Doppler-delimited along-track resolution is extremely beneficial. This resolution is relatively unaffected by along-track artifacts, such as surface roughness or mean slope. Even more important, Doppler passband control means that off-nadir scatterers that fall into unwanted Doppler bins can be suppressed during data analysis.

Stated abstractly, the parallel-Doppler algorithm has inherently high post-processing signal-to-clutter ratio (SCR).

Downward-looking radar produces waveforms whose detailed structure is determined by the convolution of the instrument's characteristic response function with the physical properties of the scattering medium. The unique parallel-Doppler characteristic response function of the radar ice sounder of the present invention is much sharper than the waveform of more conventional instruments. The shape, strength, and small standard deviation of this unique waveform are the main reasons that a parallel Doppler processing algorithm yields better geophysical measurements. In summary, the parallel-Doppler algorithm is the first and only approach to ice sounding that offers simultaneously high SSR, high SNR, and high SCR, thus enabling new and improved measurement capabilities.

Figure 5B:
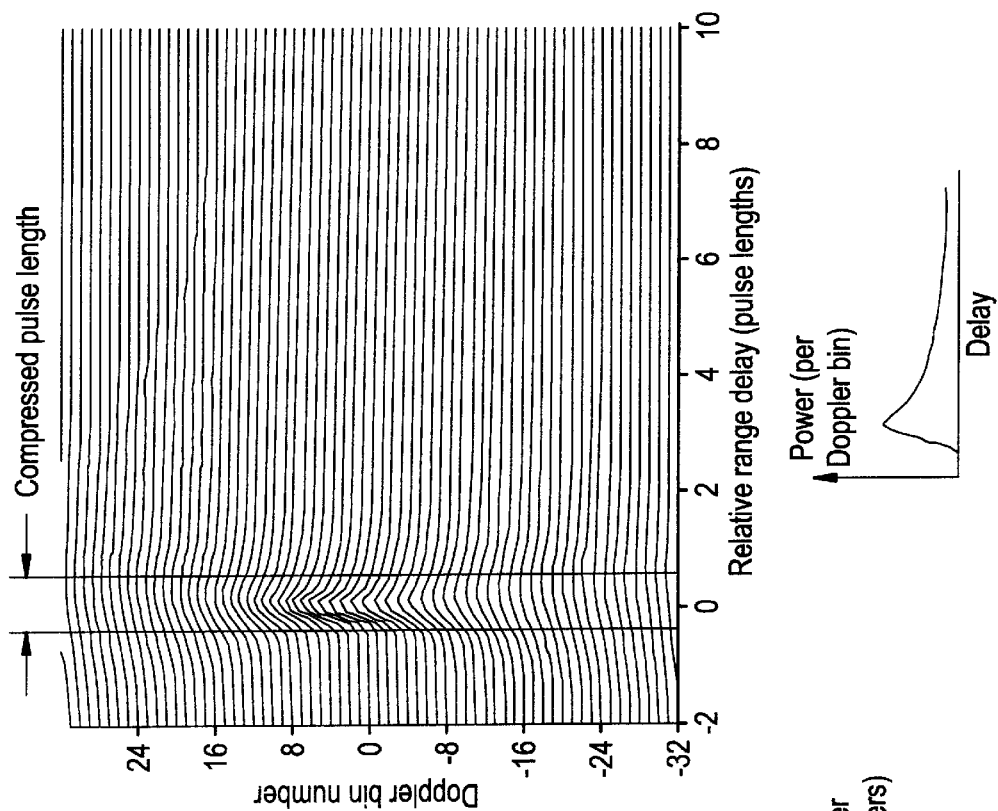
FIGS. 5(a) and 5(b) show a comparison of the range/Doppler history from a single scatterer or layer, after range compression of a radar sounder or altimeter before delay/Doppler range compensation (FIG. 5(a)) and after delay/Doppler range compensation (FIG. 5(b))
Figure 5A:
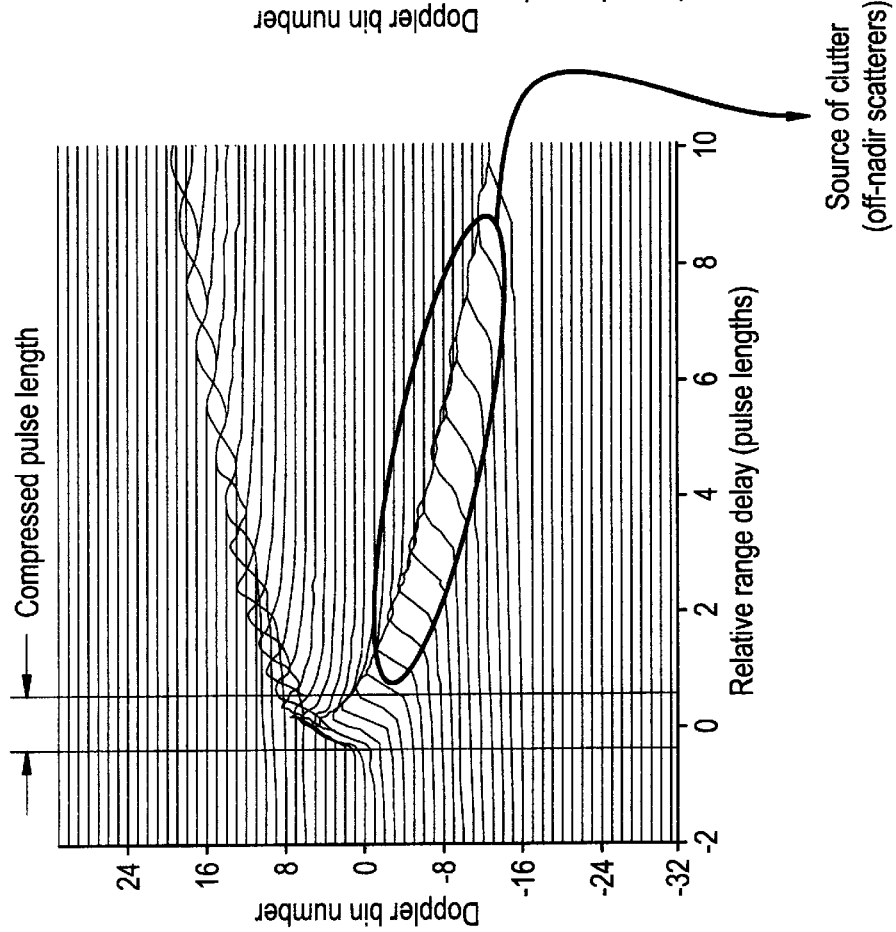

The effect of Doppler analysis and delay compensation is illustrated in FIGS. 5(a) and 5(b), in which the observed signals have been compressed to their fully resolved pulse length, and the resulting power profiles are sorted by Doppler bin. This figure can be interpreted in two different ways, the full field view, or the signal history view. Either view is valid. In this simple example, only one hyperbolic waveform history is shown, as it would arise either from the top surface of an ice sheet or from within the ice volume itself.

FIG. 5(a), interpreted as a full field view, illustrates the power response of the sounder to an ensemble of scatterers uniformly distributed over the field of view in the Doppler (along-track) direction. At all Doppler frequencies away from the nadir direction (which corresponds to zero Doppler), there is an extra range delay due to the extra distance that each reflected signal must traverse. Left uncorrected, this implies that a "flat" surface will appear as a convex hyperbolic surface in range/Doppler space. Such hyperbolae from many scatterers will overlap each other in the usual range/time space, since all of the surface returns are mixed together. However, in the range/Doppler domain, these hyperbole coincide and can be observed directly. The extra delays can be determined from the viewing geometry. Hence these unwanted delays can be estimated and removed from the data in each Doppler bin. This operation is central to the parallel-Doppler algorithm.

Figure 2A:
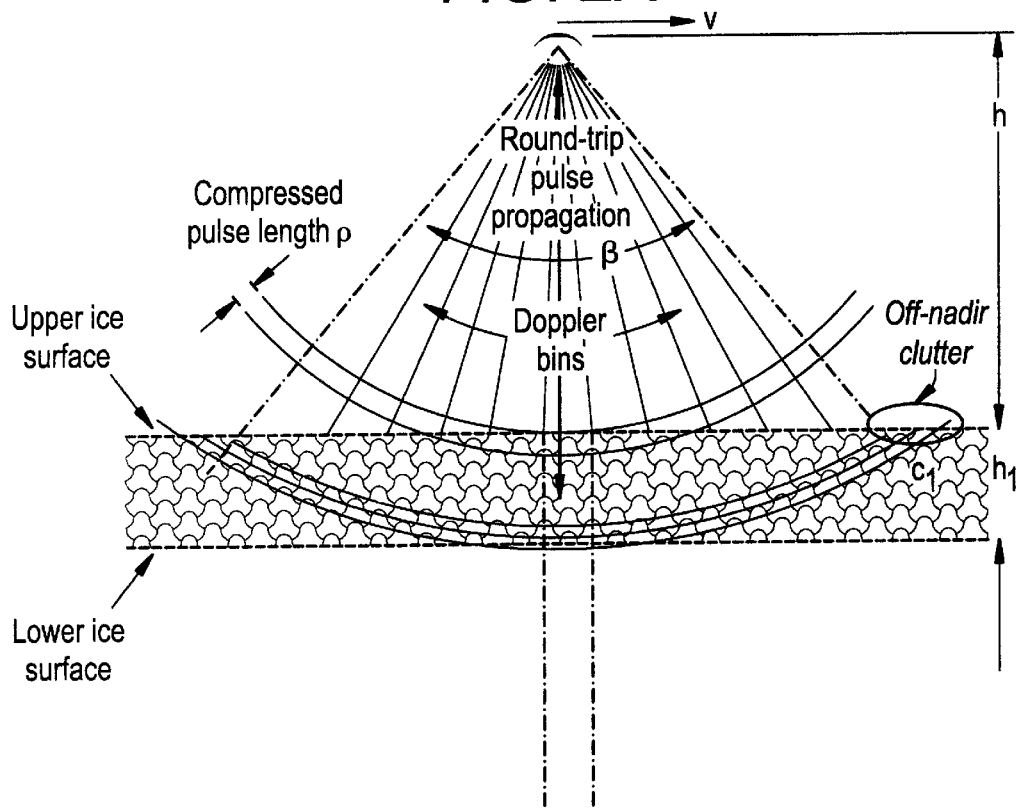
FIGS. 2(a) and 2(b) are an elevation view and a plan view, respectively, of a basic ice sheet sounding technique using coherent integration.
Figure 2B:
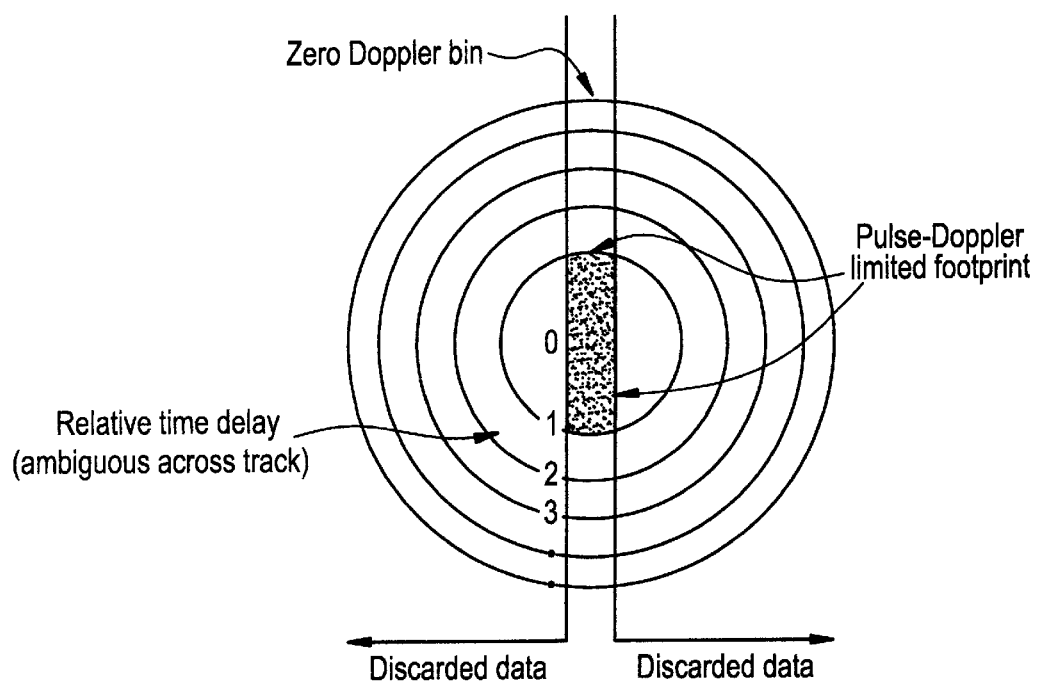

FIG. 5(a), interpreted as a signal history view, illustrates a time history of the radar's power response to a single scatterer over a sequence of pulses emitted as the sounder passes overhead. Zero Doppler corresponds to pulses emitted when the radar is directly above the scatterer. At all Doppler frequencies away from the nadir direction, there is an extra range delay due to the extra distance that each reflected signal must traverse. Left uncorrected, this implies that the range history in the data record will appear as a convex hyperbolic locus, whose extent is limited only by the field of view (and the system SNR) of the radar. Unlike the flat surface case of the previous interpretation, such loci are commonly observed from isolated strong scatterers whose reflections are portrayed in the range/time domain. As in the previous interpretation, the extra range delays evident in the range/Doppler domain of FIG. 2(a) can be determined from the viewing geometry. Hence, the processor can remove them from the data. The result, as shown in FIG. 5(b), is a sequence of post-processing soundings that have the correct depth for all along-track scatterers.

As seen in FIGS. 5(a) and 5(b) the principal advantage of the present invention, which includes a sounding radar that incorporates parallel Doppler processing, is that much more of the received signal is converted to useful waveform data. By shifting the range delay of all reflections (including clutter signals) to the correct depth, unwanted clutter returns from the same range but lesser depths are suppressed. As will be seen below, full suppression is strictly true only for scatterers along the sub-sensor locus. Scatterers that lie cross-track to one side or the other still will contribute to the clutter signal, but their relative strength is much less through the parallel-Doppler algorithm than through any other analysis methodology.

Figure 6A:
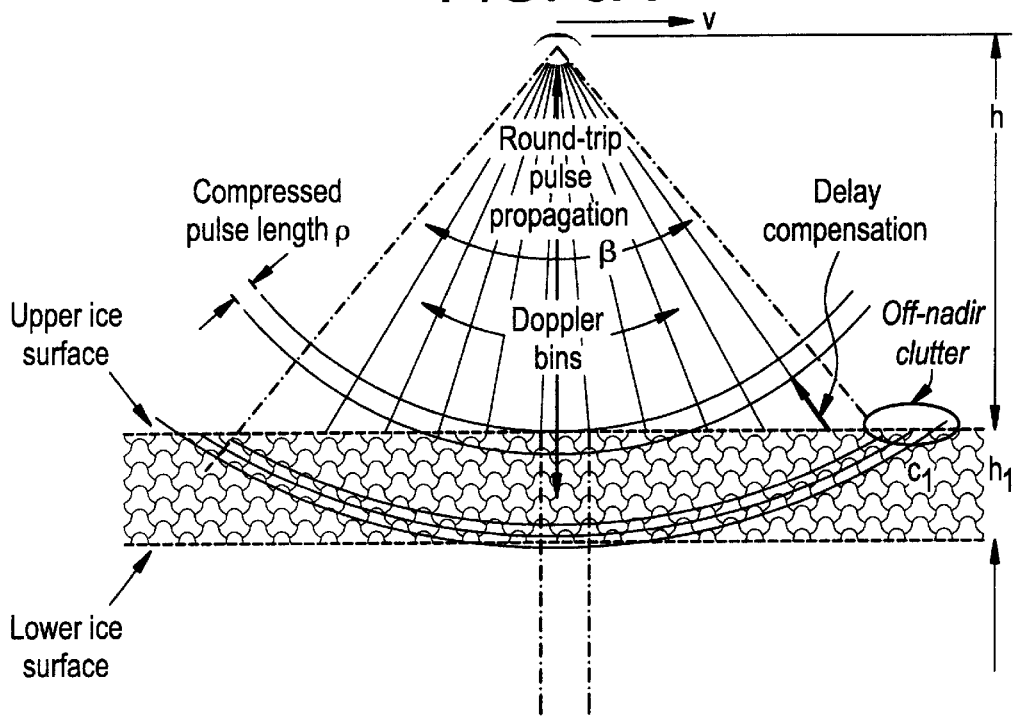
FIGS. 6(a) and 6(b) are an elevation view and plan view, respectively, of an ice sounder operating with the parallel-Doppler algorithm of the present invention.
Figure 6B:
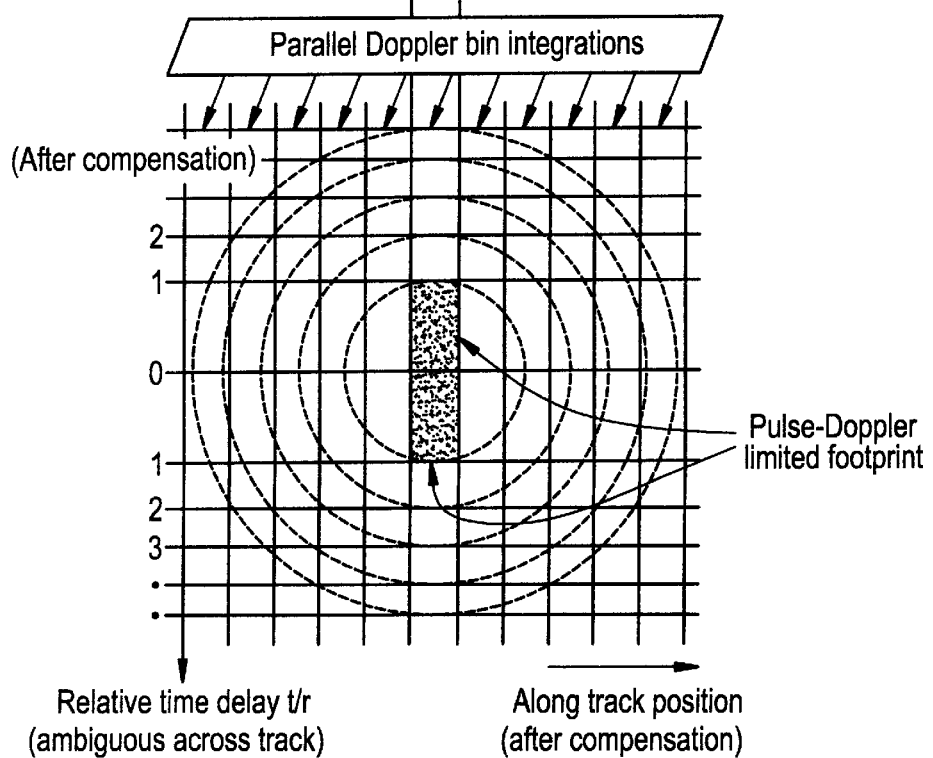

FIGS. 6(a) and 6(b) show the parallel Doppler ice sounder of the present invention. The signal processing consists of block-by-block along-track Fast Fourier transforms (FFTs) of the data into the Doppler frequency domain, followed by a phase multiplication or other techniques to correct the differential delay (off-nadir range-delay errors) of the along-track range measurement. The algorithm integrates the entire history of reflections from each scatterer to form its range-delay measurement. This integration, performed in many parallel frequency-offset Doppler bins, is the basis for the advantages enjoyed by the parallel-Doppler approach over both prior approaches.

A parallel-Doppler radar sounder must be run coherently so that the along-track FFTs can be supported. The required processing has been demonstrated in a simulation. Analysis shows that an ice sounder designed to incorporate parallel processing over multiple Doppler bins will perform better than all other known techniques in the ice sounding context. This method provides robust means of increasing sounding depth and sensor altitude for ice sounding applications. In an operational version, the required signal processing is relatively simple, and can be implemented on-board with real-rate solid-state hardware. This means that effective ice sounding may be done remotely, with a relatively small instrument, whose output is preconditioned to have low data rate at no loss of sounding science.

Existing data from Greenland has been subjected to initial numerical analysis shown in FIGS. 7(a)–7(d). Although these data are not produced from a radar designed to implement the present invention, the data retain certain characteristics that are typical of the ice sounding application. These data from Greenland were collected by a partially coherent airborne 150 MHz ice sounding radar data in conjunction with a 1997 field campaign.

Figure 7A:
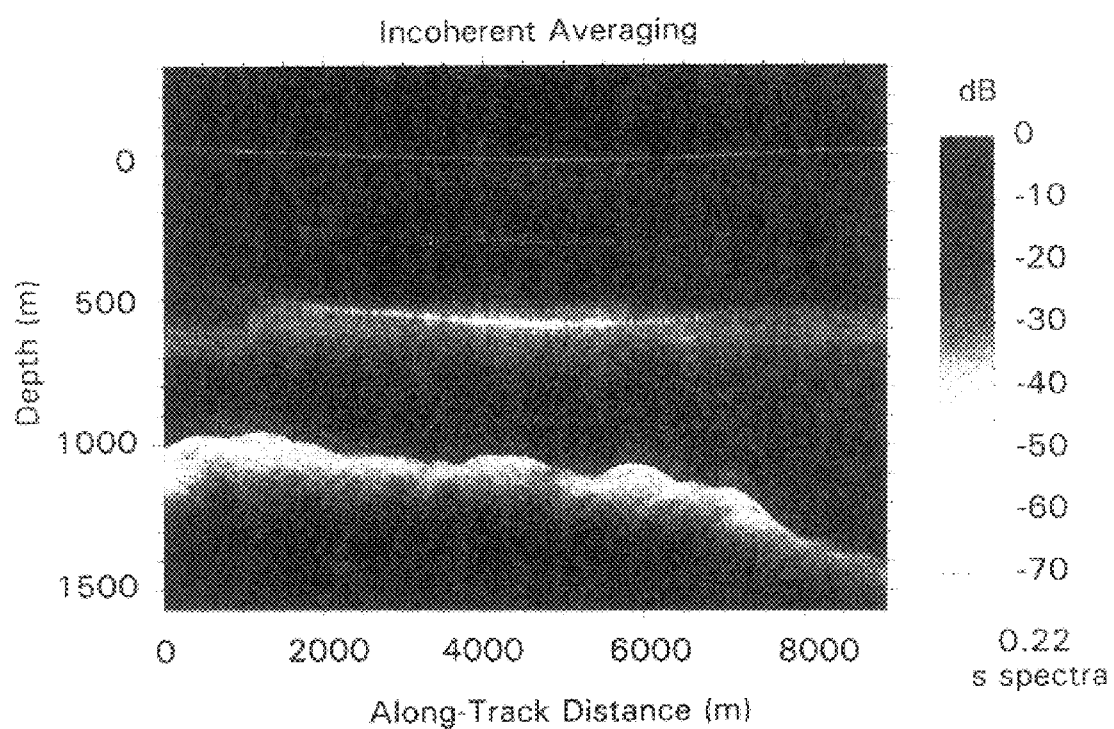
FIGS. 7 (a)–(d) are profiles showing incoherent, coherent, parallel processing (3 bins) and parallel processing (32 bins), respectively.

FIG. 7(a) is a profile using incoherent processing. In this method, the signal received from each pulse is square-law detected. At each delay (or depth) interval, a group of these detected input waveforms are added together. Each output waveform is mapped adjacent to its predecessors in sequence, to build the profile shown in FIG. 7(a). This method is known in the geophysical community as incoherent stacking.

Incoherent stacking retains essentially all of the reflected signal data. Thus, this method provides a point of reference for signal-to-noise ratio (SNR) comparisons. The disadvantage of incoherent stacking is that reflections from the side, front or back can appear as if they were at greater depth than those at minimum range, which corresponds to reflections from directly below the sounding radar. These extra range reflections appear in FIG. 7(a) as convex hyperbolae. In a complex environment, such as a sub-glacial valley or extensively stratified ice, the unwanted "clutter" signals from off-nadir scatterers can dominate the response, thus occluding valid elements of the profile. One measure of this performance factor is the sounder's signal-to-clutter ratio (SCR). In general, as noted above, incoherent stacking implies relatively poor SCR.

Figure 7B:
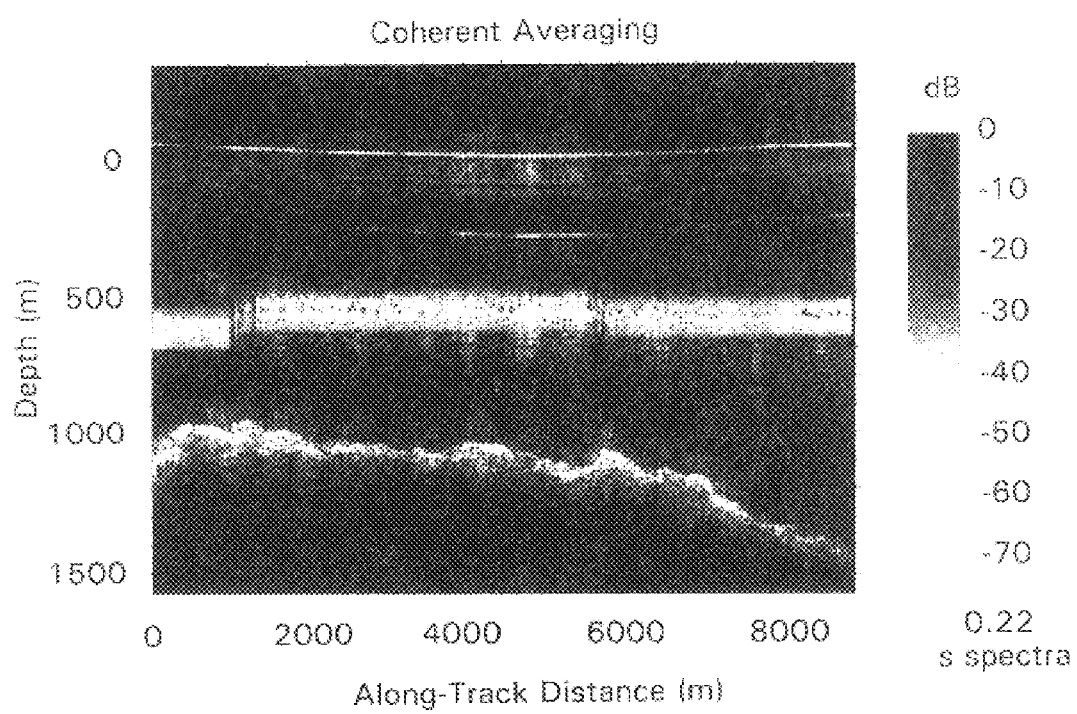

FIG. 7(b) is a profile using coherent stacking. In this method, groups of signals are summed coherently, prior to detection. Each coherent sum is square-law detected to form an output waveform. Each output waveform is mapped adjacent to its predecessors in sequence, to build the profile shown in FIG. 7(b). This method is known in the geophysical community as coherent stacking.

Most of the clutter data arising from sources in front of or behind nadir are suppressed by coherent stacking. In other words, the SCR is improved. There are two substantive disadvantages, however. First, the variance of each output waveform is relatively large. Such coherent noise is known in the synthetic aperture radar community as speckle. In this case, speckle is worse because coherent integration reduces the statistical degrees of freedom of the output. Prior to incoherent averaging, there are two degrees of freedom from each iteration of coherent stacking, in contrast to the 64 that incoherent stacking generates in this example. Thus, simple coherent stacking implies relatively poor signal-to-speckle ratio (SSR). The second disadvantage is that much, if not most, of the sounding signal is discarded by coherent stacking. Thus, the SNR of the profile is diminished.

Figure 7C:
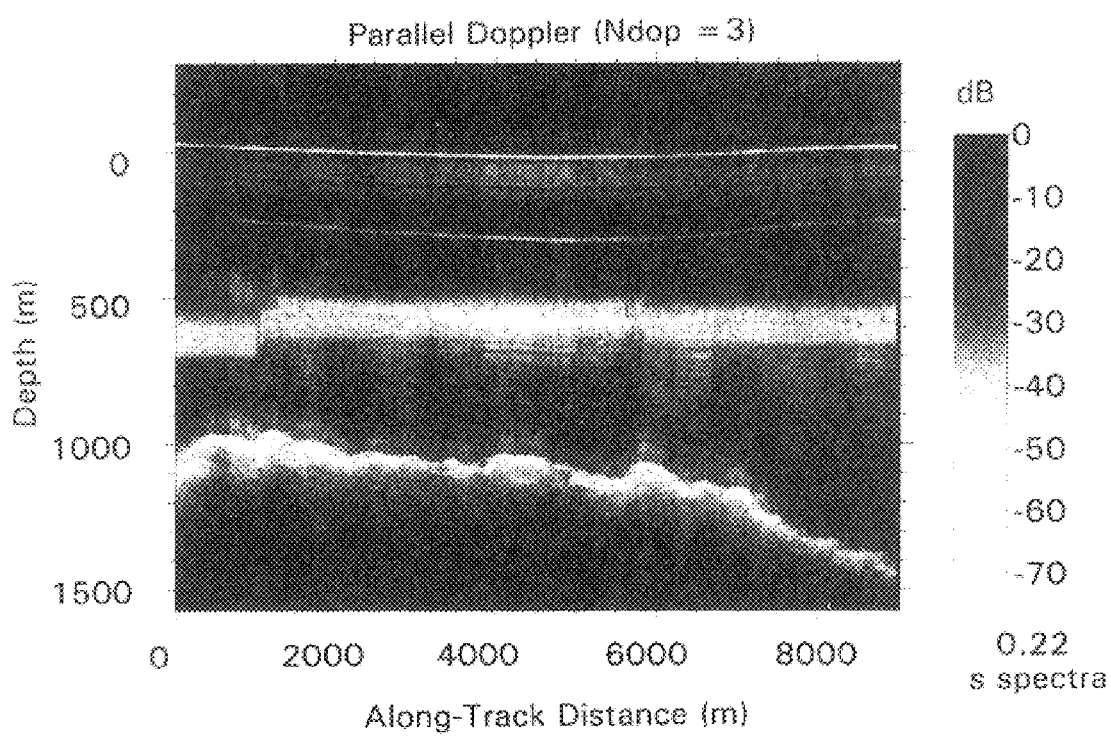

FIG. 7(c) is a profile using parallel Doppler processing. Parallel Doppler methods may be visualized as a set of coherent stacking operations carried out at offset Doppler frequencies followed by incoherent integration. Three steps are required: (1) sorting the data into Doppler bins, (2) delay compensation, and (3) parallel Doppler summation.

With respect to the Doppler bins, the sounder is operated coherently as in coherent stacking, and a sequence of undetected return waveforms is stored in memory. This is a two-dimensional data array organized by delay and pulse number. When a complete group of returns has been collected, the data are transferred to a processor for operations while the next group accumulates. In the processor, an along-track fast Fourier transform (FFT) at each delay increment integrates over the sequence of pulses. The data are thus transformed into another two-dimensional data array organized by delay and Doppler frequency. It is convenient to use a power of two for group size. For this example, there are 32 pulse returns in the input group, and the data are sorted into 32 output Doppler bins.

With respect to delay compensation, within each group, Doppler frequency corresponds to a scatterer's position along-track relative to nadir, where nadir maps into the zero-Doppler bin. At all non-zero Doppler bins, there is an extra delay due to its off-nadir location. The loci of these extra delays are hyperbolae, evident in the incoherent average example. The extra delay at each Doppler is known from the sounder's geometry. Therefore, this extra delay can be removed, for which there are several conventional means to do so including phase multiplication and integer data shift. After delay compensation, the waveform depths within all Doppler bins agree.

The delay-compensated output waveform in each Doppler bin is then square-law detected. Recall that each Doppler bin for each group corresponds to a particular along-track position. Thus, parallel Doppler summation must correctly select the corresponding waveforms across groups. Each completed output waveform is the summation across Ndop Doppler bins, where 1<Ndop<=32 for this data set. The example in FIG. 7(c) is for Ndop=3, or summation over the zero-Doppler bin and its two adjacent neighbors. In this case, the SNR and the SSR are approximately 3 times larger than that observed in the coherent stacking example.

Figure 7D:
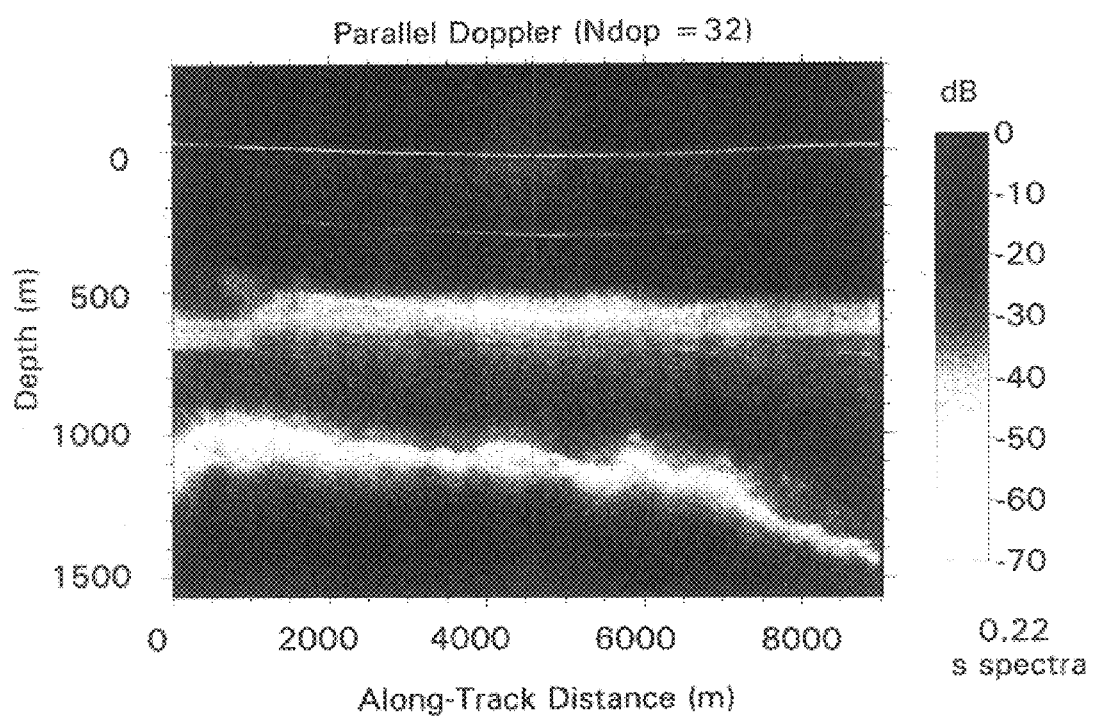

FIG. 7(d) shows parallel Doppler processing for Ndop=32, or summation over the detected and delay-compensated waveforms from all of the Doppler bins. In this case, the SNR and the SSR are significantly larger than for the Ndop=3 case in FIG. 7(c), but not necessarily ten times better. This is because the benefit of parallel Doppler integration tapers off as Ndop increases. The optimal amount of parallel integration depends on the specific sounder geometry at hand.

The present invention provides improved data analysis and thus, a reliable and accurate ice sounder by achieving high SNR, SSR and SCR, simultaneously.

The foregoing is considered as illustrative only of the principles of the invention. Further, since numerous modifications and changes will readily occur to those skilled in the art, it is not desired to limit the invention to the exact construction and applications shown and described. Accordingly, all suitable modifications and equivalents may be resorted to, falling within the scope of the invention and the appended claims and their equivalents.

What is claimed is:

1. A method for radar ice sounding, comprising the steps of:
   a) a radar providing a downwardly directed wavefront illuminating the surface and interior volume of an ice sheet;
   b) providing a receiver to collect reflected signals generated by the downwardly directed wavefront illuminating layers and other features within the volume of the ice sheet;
   c) coherently processing the collected reflected signals from the receiver;
   d) introducing a range curvature correction; and
   e) converting radar range time delay to depth profiles within the region under illumination.

2. A method for radar ice sounding, comprising the steps of:
   a) a radar illuminating a region of an ice sheet with a downwardly directed wavefront, the wavefront directing reflected signals back toward the radar;
   b) receiving the reflected signals from scatterers returned to the radar;
   c) coherently processing the reflected signals using block-by-block along track fast Fourier transforms (FFTs) into Doppler frequency domain;
   d) correcting the differential delay of the along track signal components; and
   e) forming waveforms that portray the strength of the reflected signals as a function of penetration depth into the ice.

3. A method for radar ice sounding, comprising the steps of:
   a) providing a downwardly directed illuminating wavefront from a radar at an elevation above the surface, the illuminating wavefront generating signals in the form of reflections propagating back toward the radar;
   b) receiving the reflections from scatterers on the surface and inside of the ice volume;
   c) sorting data from the reflections into Doppler bins;
   d) delay compensating the data so that waveforms from like depths within all Doppler bins agree; and
   e) summing depth waveforms across a number of Doppler bins.

4. A method for radar ice sounding comprising the steps of:
   a) providing a downwardly directed illuminating wavefront from a radar at an elevation above the surface, the illuminating wavefront generating signals in the form of reflections that propagate back toward the radar;
   b) receiving the reflections from scatterers on the surface and within the ice;
   c) performing block-by-block along-track FFTs to convert the reflections into signal data in the Doppler frequency domain;
   d) correcting a differential delay of the data within all Doppler bins to align their respective depth measurements;
   e) integrating incoherently the depth waveforms within each Doppler bin; and
   f) integrating incoherently the entire history of reflections from each scatterer across all Doppler bins to form parallel Doppler depth waveform ice sounding measurement.

5. A method according to claim 4, wherein in said step d) the differential delay is corrected using phase multiplication.

6. A method according to claim 4, wherein said step e) comprises integrating in many parallel-offset Doppler bins.

7. A method according to claim 4, wherein said step d) further comprises matching the delay correction to the dielectric constant of the ice.

8. A method according to claim 4, wherein said step f) comprises weighting the incoherent integration across Doppler bins according to the specular directivity of the reflection of the radar sounding energy from layers within the ice.

9. A method according to claim 4, wherein said steps b) and d) further comprise compensating height and speed variations of the radar for performing coherent and incoherent integrations.

* * * * *